US008146127B2

(12) United States Patent
Collins et al.

(10) Patent No.: US 8,146,127 B2
(45) Date of Patent: Mar. 27, 2012

(54) APPARATUS AND METHOD FOR PROVIDING DATA FOR A CAROUSEL

(75) Inventors: Andrew Collins, Basingstoke (GB);
Jonathan Morley, Nottingham (GB);
Charles Applegate, Basingstoke (GB);
Allan Arthurs, Farnham (GB)

(73) Assignee: Sony Europe Limited, Weybridge (GB)

( * ) Notice: Subject to any disclaimer, the term of this patent is extended or adjusted under 35 U.S.C. 154(b) by 2091 days.

(21) Appl. No.: 10/314,601

(22) Filed: Dec. 9, 2002

(65) Prior Publication Data

US 2003/0133693 A1 Jul. 17, 2003

(30) Foreign Application Priority Data

Dec. 10, 2001 (GB) .................................. 0129541.9

(51) Int. Cl.
*H04N 7/173* (2011.01)
(52) U.S. Cl. .......... 725/116; 725/114; 725/115; 725/51; 725/52; 715/723
(58) Field of Classification Search .................. 715/730, 715/731, 732, 513, 522–524; 725/51–52, 725/112–119; 386/52
See application file for complete search history.

(56) References Cited

U.S. PATENT DOCUMENTS

| | | | | |
|---|---|---|---|---|
| 5,649,186 | A * | 7/1997 | Ferguson | 707/10 |
| 5,781,245 | A * | 7/1998 | Van Der Weij et al. | 725/105 |
| 5,798,785 | A | 8/1998 | Hendricks et al. | |
| 5,806,071 | A | 9/1998 | Balderrama et al. | |
| 5,983,267 | A | 11/1999 | Shklar et al. | |
| 6,760,043 | B2 * | 7/2004 | Markel | 715/717 |
| 6,886,178 | B1 * | 4/2005 | Mao et al. | 725/52 |
| 7,155,491 | B1 * | 12/2006 | Schultz et al. | 709/217 |
| 7,181,010 | B2 * | 2/2007 | Russ et al. | 380/234 |
| 7,260,777 | B2 * | 8/2007 | Fitzsimons et al. | 715/255 |
| 2002/0056130 | A1 * | 5/2002 | Kagemoto et al. | 725/114 |
| 2003/0050995 | A1 * | 3/2003 | Mateos | 709/217 |
| 2003/0151621 | A1 * | 8/2003 | McEvilly et al. | 345/744 |

FOREIGN PATENT DOCUMENTS

EP 0 889 421 1/1999

(Continued)

OTHER PUBLICATIONS

Daigo Taguchi, et al., (Partial Translation), "Description Format of Digital Data Broadcast Service and the Way of Editing", Research Report of Information Processing Society of Japan, vol. 2001, No. 52, pp. 15-22 (Partial Translation).

(Continued)

*Primary Examiner* — Joseph P Hirl
*Assistant Examiner* — Joshua Taylor
(74) *Attorney, Agent, or Firm* — Oblon, Spivak, McClelland, Maier & Neustadt, L.L.P.

(57) ABSTRACT

An apparatus and method of providing data for a carousel from which iTV pages may be obtained including defining a plurality of information templates, each information template specifying content for an iTV page, defining a plurality of presentation templates, each presentation template specifying the presentational appearance for an iTV page, assigning a presentation template to an information template, and modifying the information template as required for presentation by the presentation template and outputting, for a carousel, data representing the presentation template and the modified information template, an iTV page being obtained from the carousel by displaying the content specified by the modified information template with the presentational appearance specified by the presentation template.

19 Claims, 3 Drawing Sheets

FOREIGN PATENT DOCUMENTS

| | | |
|---|---|---|
| WO | WO 00 24195 | 4/2000 |
| WO | WO 01/35056 | 5/2001 |
| WO | WO 02/05089 | 1/2002 |
| WO | WO 02/07013 | 1/2002 |

OTHER PUBLICATIONS

Ryuichi Ogawa, et al., (Partial Translation), "A Multimedia Authoring System for BS Data Broadcast Service", Research Report of Institute of Electronics, Information and Communication Engineers, vol. 99, No. 488, pp. 41-46.

Marc Girardot, et al., "Efficient Representation and Streaming of XML Content Over the Internet Medium", IEEE International Conference on Multimedia and Expo, vol. 1, Jul. 30, 2000 to Aug. 2, 2000, pp. 67-70. XP002160596.

Office Action issued Dec. 16, 2010 in EP Application No. 02 258 519.4.

* cited by examiner

*Content Gateway*

Content authored in presentation neutral manner

Fig 5

*Carousel Gateway*

Page links define carousel navigation structure.

APPARATUS AND METHOD FOR PROVIDING DATA FOR A CAROUSEL

BACKGROUND OF THE INVENTION

1. Field of the Invention

The present invention relates to an apparatus and method for providing data for a carousel, in particular a carousel from which interactive television pages may be constructed by a client receiver.

2. Description of the Related Art

It has become well known in recent years to provide broadcast systems, such as DVB, with interactive television (iTV) pages on a carousel. Details of broadcast and reception of such pages using carousels are well known for a variety of systems.

Although the technical considerations of broadcasting and receiving the data are well established, there are still considerable problems in constructing the required services. In particular, considerable effort is required in preparing appropriate data for displaying a particular page and, whenever that page is amended, that work must be repeated.

Although greater flexibility can be built into the system by installing appropriate applications in the client receivers, the memory and processing power available to client receivers is extremely limited.

OBJECTS OF THE INVENTION

It is an object of the present invention to provide data for a carousel which allows flexibility in the construction of the interactive services without causing undue burden on the service creators or the client receiver.

SUMMARY OF THE INVENTION

According to the present invention, there is provided a method of providing data for a carousel from which iTV pages may be obtained, the method including defining a plurality of information templates, each information template specifying content for an iTV page, defining a plurality of presentation templates, each presentation template specifying the presentational appearance for an iTV page, assigning a presentation template to an information template and modifying the information template as required for presentation by the presentation template and outputting, for a carousel, data representing the presentation template and the modified information template, an iTV page being obtained from the carousel by displaying the content specified by the modified information template with the presentational appearance specified by the presentation template.

According to the present invention, there is also provided an apparatus for providing data for a carousel from which iTV pages are made available, the apparatus including a content provider apparatus having a user interface by which a plurality of information templates may be defined, the information templates specifying content for iTV pages, a composition provider apparatus having a user interface by which a plurality of presentation templates may be defined, the presentation templates specifying presentational appearance for iTV pages, an editor having a user interface by which a presentation template may be associated with an information template and a processor for modifying said information template in accordance with the requirements of the associated presentation template and for outputting, for a carousel, data representing the presentation template and the modified information template, an iTV page being obtained from the carousel by displaying the content specified by the modified information template with the presentation appearance specified by the presentation template.

In this way, the information or content of an iTV page may be determined separately to a number of different composition or presentations for iTV pages. This allows the roles of creation to be separated. Furthermore, it allows considerable variety to be introduced into the iTV pages without undue burden on either the creators or the client receiver.

The user of the editor is able to choose freely how content will appear to the client by choosing from the selection of presentation templates.

Preferably, data defines a predetermined set of variable presentation features for iTV pages in the form of a presentation framework, each presentational feature having a respective plurality of states, and a presentation template is defined on the basis of states defined by the user interface for the presentation template.

In this way, the operator of the composition gateway or provider apparatus has artistic control and can create a presentation template for use by an editor.

Preferably, information templates are defined having tags identifying different respective content portions and presentation templates are defined having corresponding tags identifying representation areas of an iTV page so that, from the respective tags, the layout of respective content portions may be defined for an iTV page.

This provides a mechanism by which the client receiver may apply the required presentational features to the respective content portions of the associated information template. Processing requirements for the client receiver are relatively small, despite the available flexibility.

Preferably, the user/editor defines links for information templates identifying other information templates, the links and tags identifying respective links being provided in the corresponding modified information templates and corresponding tags associated with representations of operating keys being defined in the presentation templates such that, for the resulting iTV page, operation of an operating key of a client receiver causes movement to another information template according to the link identified by the tag associated with the operating key.

In this way, the links which are introduced by the user/editor are displayed in the manner defined by the chosen presentation template and the client receiver easily identifies the required links.

Preferably, when the editor defines a link for a first information template to a second information template, the second information template is associated with the presentation template of the first information template unless the user associates the second information template with a different presentation template.

In this way, it becomes straightforward for the user/editor to link pages in a cascaded fashion. Furthermore, since often such cascaded pages will be required to have the same appearance, associating those pages with the same presentation template simplifies processing and reduces the amount of data required for broadcast.

The information templates are modified according to the nature of the associated presentation template in a manner to format the data of the information templates suitably and minimise the processing required by the client receiver. For instance, the information templates may be modified by inserting appropriate line and page breaks in text such that the text fits into areas defined by corresponding presentation templates and/or by scaling images such that the images fit into areas defined by the corresponding presentation templates.

It should be appreciated that the invention could also be embodied as code components for execution on a computer and as a computer readable storage medium having recorded thereon such code components. Similarly, the present invention may be embodied in a broadcast or information system and as a signal representing the modified content of the information template.

DETAILED DESCRIPTION OF THE PREFERRED EMBODIMENTS

The invention will be more clearly understood from the following description, given by way of example only, with reference to the accompanying drawings.

The following description relates to the provision of interactive television (iTV) pages on a carousel for broadcast to client receivers or gateways. Details of broadcast and reception of such pages using carousels are well known for a variety of broadcast and information systems. Various commercial information services, such as sports, entertainment listings and public service information may be provided in this way. According to the embodiments described below, it is possible to specify the presentation and technical configuration of applications for, for instance, DVB-MHP services.

It has been considered to provide information templates defining the content of an iTV page in a predetermined manner such that an application running on a client receiver can arrange the content to take a predetermined appearance on the iTV page. For instance, the client receiver may run an application for a particular broadcast service provider which puts the title, summary and main body of the content in predetermined positions, together with predetermined logos and "Quick-Nav" colour buttons.

Although this is a very effective system, since the carousels only broadcast the content, it places considerable processing burden on the client receivers and is limited in flexibility of appearance. In particular, it is difficult to change the appearance of the pages provided to the user. In this regard, it may be desired to arrange the appearance of the pages differently for different subject-matter or at different times of year. For instance, at Christmas time, it may be desirable to present iTV pages having seasonal icons such as holly leaves.

The present invention provides an improvement on this system.

Figure 1:
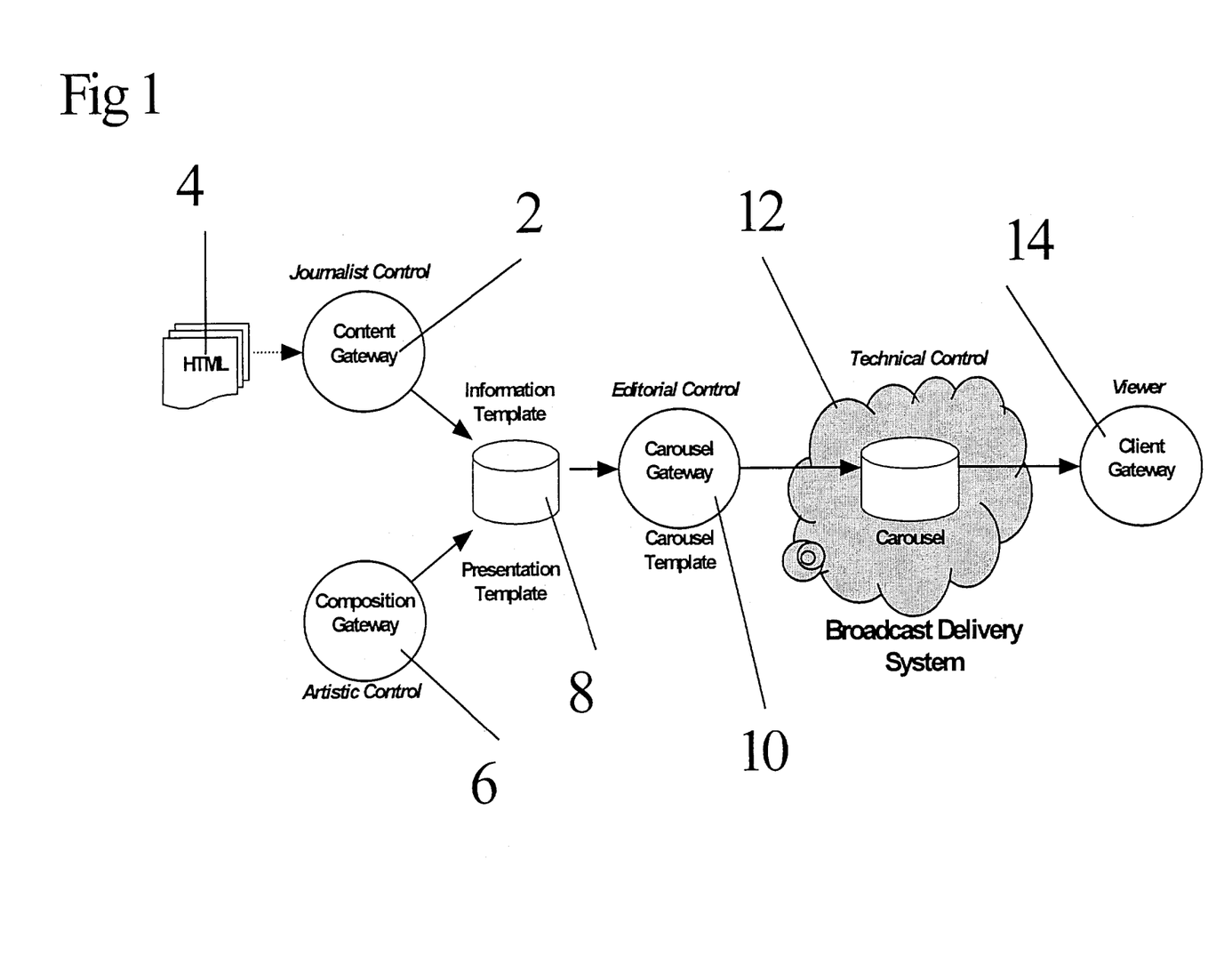
FIG. 1 illustrates a broadcast system embodying the present invention.

As illustrated in FIG. 1, a content gateway 2 is provided. This is directly equivalent to the discussions above. By means of this gateway, a user is given journalistic control to determine the content of an iTV page. The gateway includes a user interface and may be in the form of a personal computer. The user may create his/her own content, for instance entering articles with titles and various sections and possibly also images, whether still or moving. Alternatively, data for the content may be taken manually or automatically from external sources such as HTML pages or databases 4. The content of a particular page is defined as an information template.

Unlike the system described above, an additional gateway 6 is also provided. This composition gateway 6 also includes a user interface and may similarly take the form of a personal computer. This gateway allows artistic control and allows a user (possibly different to that operating the content gateway 2) to create the overall appearance of an iTV page. The creator may have a type of journalistic content in mind and will define in general terms where on the page the title and various sections will appear, the sizes of those sections, etc. Any other aspects of the appearance may also be defined, for instance the background colour or pattern, any additional logos or icons and the positions and appearances of any link symbols, for instance numbered buttons, left-right arrow keys, up-down arrow keys and Quick-Nav colour button keys corresponding to the keys of a client receiver's control, such as a TV remote control.

It is proposed that the composition gateway may provide the user with a presentation framework which includes all of the variable features of appearance. The user may then set particular values for those variables so as to define a particular presentation template.

Thus, while the content gateway 2 enables a user to determine the content of a particular page, the composition gateway 6 allows a user to create an appearance for a page which may be applied to any respective content as defined by the content gateway 2.

The resulting information templates from the content gateway 2 and presentation templates from the composition gateway 6 are stored in a database 8 for instance, a relational database or flat file data store.

As illustrated, a carousel gateway 10 is provided with access to the content of the database 8. The carousel gateway 10 provides editorial control.

Like the content gateway 2 and composition gateway 6, the carousel gateway 10 is provided with a user interface and may take the form of a personal computer. The carousel gateway provides an editor by which presentation templates may be assigned to respective information templates. In this way, the user of the editor has control to choose a desired presentational appearance for particular content and to change this appearance as required easily by choosing a different presentation template. The apparatus has clear significant advantages in allowing three different users with different abilities, to create the content, the presentation and the final edit. The users may be remote from one another with gateways distributed over a network. However, it should be understood that all three gateways could be provided together with a single user interface.

Having assigned a particular presentation template to an information template, the resulting data is provided to the carousel 12 of a broadcast delivery system. However, it is important to note that, before being placed on the carousel, the information template is modified according to the presentation template with which it has been assigned. In particular, the information template is provided on the carousel 12 in a modified form which is suitable for combining with its presentation template by a client receiver 14 using minimum processing. In particular, the content of the information template is processed so as to be of an appropriate format to fit directly into the presentation template. For instance, if a body of text in the information template is too large to fit into an area of the page assigned to it by the presentation template, page breaks are inserted at the appropriate points of the text. Thus, when the client gateway or receiver 14 receives the modified information template, it is not necessary to calculate how much text will fit into the respective display area of the page. The text between page breaks can be inserted directly into the presentation template, keys, such as the left-right arrow keys, being used to move between the portions of the text separated by the page breaks.

In order to allow association between the information templates and presentation templates, the templates are provided with tags or meta data relating to various aspects or portions of the content. Thus, content added in the content gateway 2 for the title of a particular page will have a particular tag indicating that it is a title and the presentation template will have a corresponding tag indicating the particular portion of the display page meant for the title. In this way, the client gateway or receiver 14 identifies each of the respective content portions and inserts them into the page as required by the presentation template.

Similarly, the user/editor operating the carousel gateway 10 will typically associate other iTV pages with particular keys of a client receiver control such that operation of a key takes the user to the respective associated page. As mentioned above, the presentation template provides representations of these keys, such as numbered keys, up-down arrow keys and Quick-Nav keys. When the user/editor associates keys with particular pages, reference to those particular pages will be stored in the modified information template and associated, for instance by tags, to the respective keys of the presentation template. Furthermore, appropriate key words may also be associated with the respective pages and keys. In this way, the client gateway or receiver 14 may easily display the key word with the appropriate key of the presentation template in the iTV page and also associate the respective displayed keys with the stored pages for when the corresponding actual keys of the receiver control are operated.

Carousel templates may also be provided by the carousel gateway 10 for defining the structure of the carousels. These are technical signal parameters for optimised caching.

Thus, the use of presentation and carousel templates allow control of the layout display and technical delivery details. The separation of information template and presentation template data allows the service essence to be managed separately from the target application. Creation of the target application requires careful consideration of the device parameters and display properties. Crafting this application is the most costly and resource expensive portion of creating an interactive service proposition. Using a neutral content representation, a navigation and handling layer can be built as a set of components or software development kit that can be used along with a server-side management system. The client application programming interface (API) can be used to assist the development of attractive new applications without disrupting the work flow and management architecture on the head-end side.

A major consideration in the delivery of interactive services, particularly in bandwidth scarce DTT (Digital Terrestrial Television) is optimisation of the carousel structure. In a preferred embodiment, the apparatus described above supports a sophisticated XML template for the description of the carousel structure. The efficient generation of this template based on packing heuristics and knowledge of receiver caching strategies allows performance improvements in the delivery of the service offering.

To allow stylistic freshness, promotional or seasonal emphasis and changes in branding for different vendors, the presentation template layer is used to map the essence in the information template into the desired artistic layout.

The separation of display and information allows rapid design adjustment, where the presentation template can take the form of a "skin" applied to a core service. The apparatus of the present invention may apply a presentation template to each information template node within a service offering. The presentation template defines the location, colour, font or graphic associated with a particular "panel", eg. title panel. The information template contains the textual or image content for a particular panel. Construction of a service entails building a carousel structure that consists of a set of information template and presentation template mappings. The association of a presentation template to an information template provides the basis for applying automated layout rules and constraints to message line length and wrapping where required. As explained above, the apparatus performs as much processing as possible on the server to reduce the processing burden on the client application.

Typical TV information service offerings have in the order of 500 to 3,000 pages. This creates a significant effort in maintaining the integrity of links throughout the service and consistency in the user navigation experience.

Figure 2:
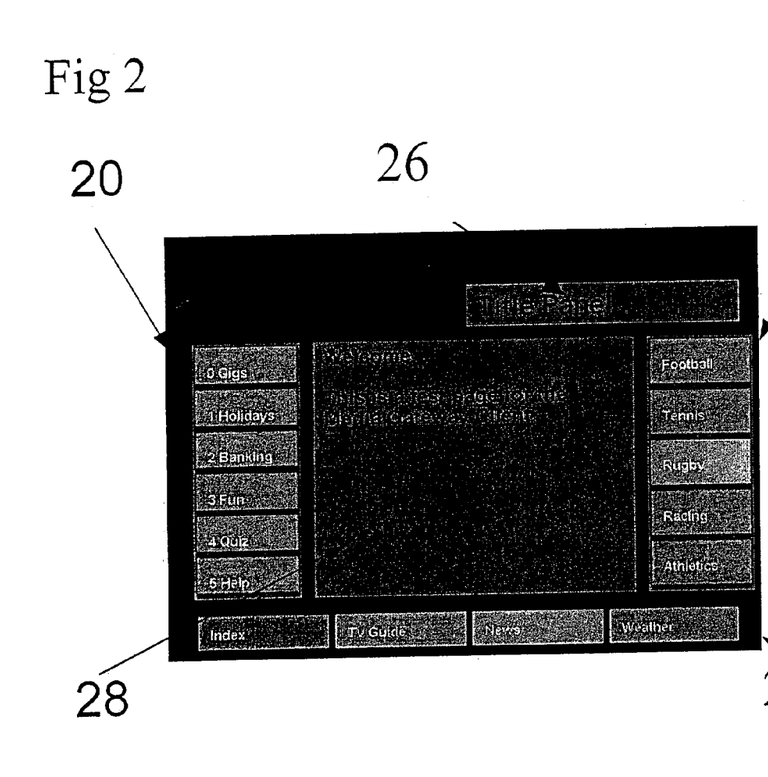
FIG. 2 illustrates an example of a graphical representation of a presentation template.

It is proposed to provide three inter-page navigation methods directly related to the control keys of the client receiver, for instance the remote control keys for Quick-Nav, numbered and list. In addition, a method of intra-page navigation may be provided for large textual items. FIG. 2 shows as a graphical representation all of these methods applied to a basic presentation template. The mechanisms provided constrain the viewer and service designer to a single linkage method away from a particular page. The lack of "focus" or state based mechanisms greatly simplifies service comprehension and construction. In particular, "focus" based systems require highlighting or "focus" for selected features and movement of this highlighting or "focus" to consecutive features with actuation of up/down operation keys and the like. Similarly, state based mechanisms are required to remember the position of the feature selected last. As will be made clear below, this may be avoided by providing direct correspondence between particular operation keys, such as the number keys or Quick-Nav keys, and features of the displayed page. Hence, the processing requirements at the user/client gateway are reduced.

Using the composition gateway, a user is able to create a presentation appearance having any desired format. FIG. 2 illustrates a particular format. This presentation template is indicated with text labels inserted into the keys by the editor, but without any content from an information template.

On the left, six number keys 20 are provided corresponding to numbers 0 to 5 on a client control. By operating one of these keys on the client control, the corresponding page will be selected.

Similarly, on the bottom, four Quick-Nav keys 22 are provided. These have the four colours of the Quick-Nav colour keys of the operating control of a client receiver.

On the right, a list 24 of five other topics are provided, each item in the list corresponding to a link to another page. Individual items of this list 24 may be selected using the up-down arrow keys of the operating control of a client receiver.

For completeness, it is also noted that in the illustrated presentation template, a title area 26 is provided on the upper right side for title information from an information template and a central area 28 is provided for the main body text from an information template. As mentioned above, if the body of text from the information template is too large for the text area 28, page breaks are inserted in the text. The left-right arrow keys of the operating control of the client receiver may be used to turn through a set of pages in this area. Similarly, long titles may be wrapped onto two lines.

Figure 3:
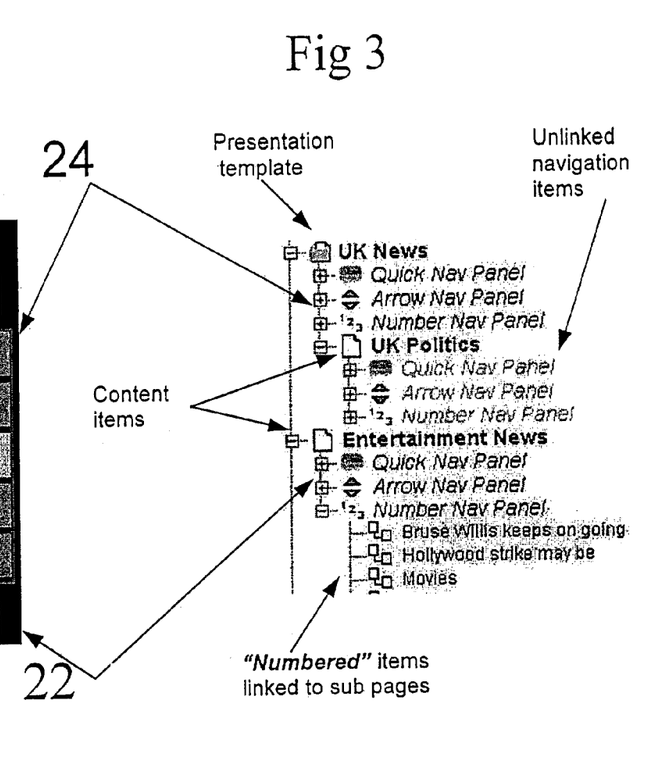
FIG. 3 illustrates a selected cascade of templates.

The carousel organisation constructed in the apparatus is built by choosing a presentation template which defines a node with a set of links as shown in FIG. 3.

Adding nodes with the desired presentation templates expands the service structure. As the presentation template only defines which nodes are possible, the information template at each node maintains the link from one information template to another. This allows a presentation template to be applied to groups of information nodes. FIG. 3 shows a single presentation template whose style cascades to the other sub nodes. In other words, since the information templates of the sub nodes are not defined with different presentation templates, they automatically take the style of the presentation template of the node from which they cascade.

The separation of journalistic content and artistic presentation maintained in the information and presentation templates naturally maps to the role and work flow relationships in building and maintaining information services. Although these roles are often interlinked in the interactive television industry today, as the need to maintain larger and more complex information services grows, the need to coordinate multiple activities for a single service will increase, mirroring the situation in the early development of web services. This apparatus applies the technical separation made with presentation and information templates to facilitate the natural role separation of journalistic and artistic activities.

As explained above with reference to FIG. 1, the content gateway and composition gateway provide appropriate tools for each user. The content gateway allows a journalist to acquire, create and edit content items, whereas the composition gateway provides a graphical tool for layout design.

Figure 4:
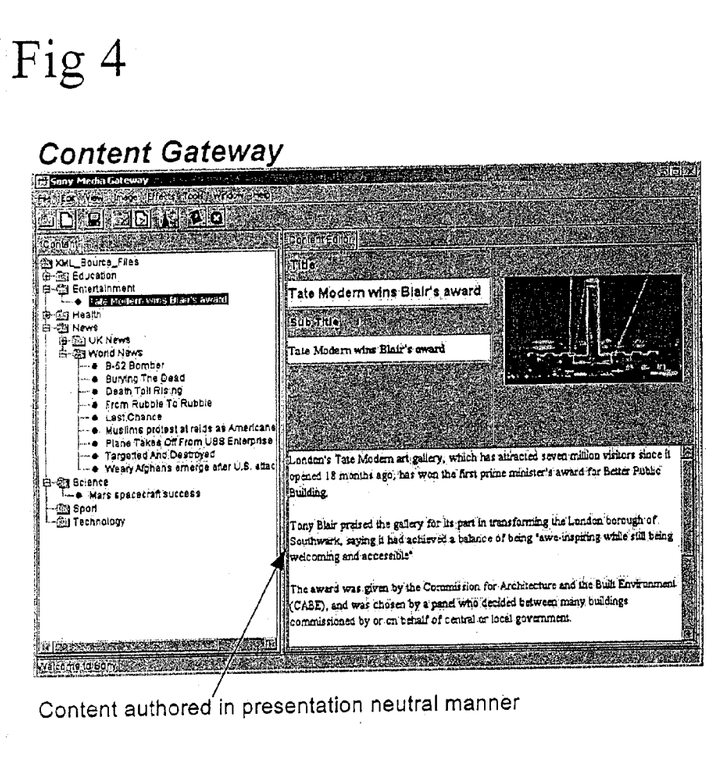
FIG. 4 illustrates the user interface of a content gateway.

A view of an example content gateway is illustrated in FIG. 4.

Figure 5:
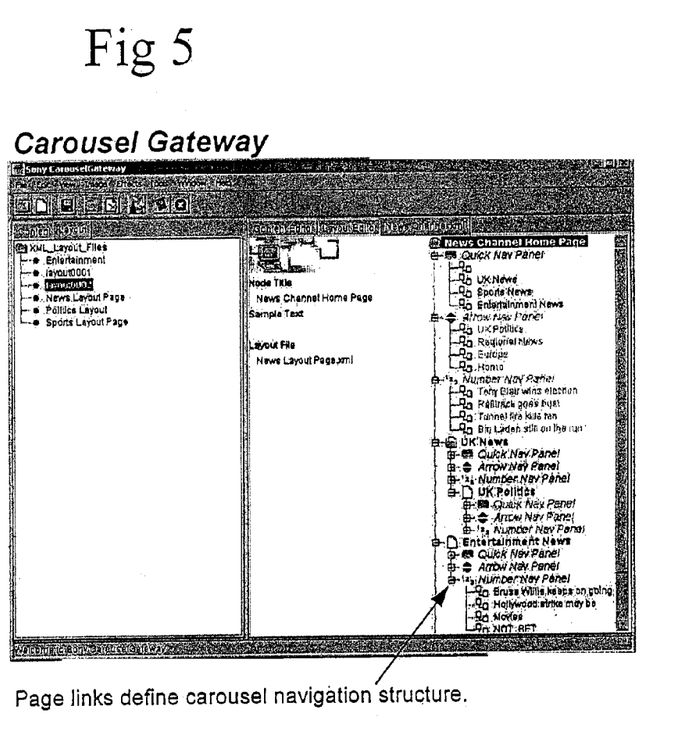
FIG. 5 illustrates a user interface of a carousel gateway.

The two components are brought together under editorial control by the carousel gateway, an example of which is illustrated in FIG. 5. This allows an editor to select prepared content and presentation items and blend them into a service offering. In the illustrated example, templates may be drag and dropped into desired positions in the navigation structure as indicated on the far right.

We claim:

1. A broadcast system for broadcasting to a plurality of client receivers, comprising:
    a carousel configured to make iTV pages available; and
    an apparatus configured to provide data to the carousel, the apparatus including
        a content provider apparatus having a user interface configured to define a plurality of information templates, the information templates including a content for iTV pages,
        a composition provider apparatus having a user interface configured to define a plurality of presentation templates, the presentation templates specifying a presentational appearance for iTV pages,
        an editor having a user interface configured to receive a direct user association of a presentation template with an information template, and
        processor configured to modify said information template by modifying the content of the information template in accordance with at least one requirement of the associated presentation template, the processor being configured to output, to the carousel, both the presentation template and the modified information template,
    wherein both the presentation template and the modified information template are provided to the plurality of client receivers by the carousel, an iTV page being obtained from the carousel by displaying the content specified by the modified information template with the presentation appearance specified by the presentation template.

2. The broadcast system according to claim 1 wherein the composition provider apparatus further comprises:
    a memory configured to hold data defining predetermined set of variable presentational features for iTV pages in the form of a presentation framework, each presentational feature having a respective plurality of states; and
    a defining mechanism configured to define a presentation template on the basis of states defined by the user interface for the presentation template.

3. The broadcast system according to claim 1 wherein:
    the content provider apparatus is configured to define information templates having a plurality of tags to identify a plurality of different respective content portions, and
    the composition provider apparatus is configured to define presentation templates having a plurality of corresponding tags to identify a plurality of representation areas of an iTV page so that, from the respective tags, a layout of respective content portions may be defined for the iTV page.

4. The broadcast system according to claim 1 wherein:
    the editor is configured to define a plurality of links for information templates to identify other information templates;
    the processor is configured to provide, in the corresponding modified information templates, the links and a plurality of tags identifying respective links; and
    the composition provider apparatus is configured to define presentation templates having corresponding tags associated with a plurality of representations of operating keys such that, for a resulting iTV page, an operation of an operating key of a client receiver is configured to cause movement to another information template according to the link identified by the tag associated with the operating key.

5. The broadcast system according to claim 4 wherein, when the editor is configured to define a link for a first information template to a second information template, said second information template is associated with the presentation template of said first information template unless a user of the editor associates the second information template with a different presentation template.

6. The broadcast system according to claim 1 wherein said processor is configured to modify information templates by inserting a plurality of appropriate line and page breaks in a text such that the text fits into a plurality of areas defined by corresponding presentation templates.

7. The broadcast system according to claim 1 wherein said processor is configured to modify information templates by scaling a plurality of images such that the images fit into a plurality of areas defined by the corresponding presentation templates.

8. The broadcast system according to claim 1 wherein at least one of the content provider apparatus, the composition provider apparatus and the editor is connected to another of the content provider apparatus, the composition provider apparatus and the editor over a network.

9. A method of causing a processing apparatus to provide data via a broadcast system for a carousel from which a plurality of iTV pages may be obtained by a plurality of client receivers, the method comprising:
    making iTV pages available from the carousel;

defining, in the processing apparatus, a plurality of information templates, each information template specifying a content for an iTV page;

defining, in the processing apparatus, a plurality of presentation templates, each presentation template specifying a presentational appearance for the iTV page;

receiving, in the processing apparatus, a direct user association of a presentation template with an information template;

modifying, in a data processor of the processing apparatus, the information template by modifying the content of the information template in accordance with at least one requirement of the presentation template; and outputting, from the processing apparatus to the carousel, both the presentation template and a modified information template, wherein both the presentation template and the modified information template are provided to the plurality of client receivers by the carousel, an iTV page being obtained from the carousel by displaying the content specified by the modified information template with the presentational appearance specified by the presentation template.

10. A method according to claim 9 further comprising:

providing, in a memory of the processing apparatus, data defining a predetermined set of variable presentational features for iTV pages in the form of a presentation framework, each presentational feature having a respective plurality of states; and defining, in the processing apparatus, a presentation template on the basis of a plurality of states defined for the presentation template.

11. A method according to claim 9 further comprising:

defining, in the processing apparatus, information templates having a plurality of tags to identify a plurality of different respective content portions and presentation templates having corresponding tags to identify a plurality of representation areas of an iTV page so that, from the respective tags, a layout of respective content portions may be defined for an iTV page.

12. A method according to claim 9 further comprising:

defining, in the processing apparatus, links for information templates identifying other information templates, providing, from the processing apparatus, in the corresponding modified information templates, the links and tags identifying respective links and defining presentation templates having corresponding tags associated with representations of operating keys such that, for a resulting iTV page, operation of an operating key of a client receiver causes movement to another information template according to the link identified by the tag associated with the operating key.

13. A method according to claim 12 wherein, when a link as defined for a first information template to a second information template, said second information template is associated with the presentation template of said first information template unless a user associates the second information template with a different presentation template.

14. A method according to claim 9 further comprising:

modifying, in the data processor of the processing apparatus, information templates by inserting a plurality of appropriate line and page breaks in a text such that the text fits into a plurality of areas defined by corresponding presentation templates.

15. A method according to claim 9 further comprising:

modifying, in the data processor of the processing apparatus, information templates by scaling a plurality of images such that the images fit into a plurality of areas defined by the corresponding presentation templates.

16. An information system for supplying information including an apparatus for providing data for a carousel from which a plurality of iTV pages are made available to a plurality of client receivers, the information system comprising:

a carousel configured to make iTV pages available; and an apparatus configured to provide data to the carousel, the apparatus including a content provider apparatus having a user interface configured to define a plurality of information templates, the information templates including a content for iTV pages, a composition provider apparatus having a user interface configured to define a plurality of presentation templates, the presentation templates specifying a presentational appearance for iTV pages, an editor having a user interface configured to receive a direct user association of a presentation template with an information template, and a processor configured to modify said information template by modifying the content of the information template in accordance with at least one requirement of the associated presentation template, the processor being configured to output, to a carousel, both the presentation template and the modified information template, wherein both the presentation template and the modified information template are provided to the plurality of client receives by the carousel, an iTV page being obtained from the carousel by displaying the content specified by the modified information template with the presentation appearance specified by the presentation template.

17. A method of causing a processing apparatus to provide data via an information system for a carousel from which a plurality of iTV pages may be obtained by a plurality of client receivers, the method comprising:

making iTV pages available from the carousel;

defining, in the processing apparatus, a plurality of information templates, each information template specifying a content for an iTV page;

defining, in the processing device, a plurality of presentation templates, each presentation template specifying a presentational appearance for the iTV page;

receiving, in the processing apparatus, a direct user association of a presentation template with an information template;

modifying, in a data processor of the processing apparatus, the information template by modifying the content of the information template in accordance with at least one requirement of the presentation template; and outputting, from the processing apparatus to the carousel, both the presentation template and a modified information template, wherein both the presentation template and the modified information template are provided to the plurality of client receives by the carousel, an iTV page being obtained from the carousel by displaying the content specified by the modified information template with the presentational appearance specified by the presentation template.

18. A non-transitory computer-readable medium storing computer readable instructions thereon that when executed by a processor cause the processor to implement a system comprising:

a carousel unit configured to make iTV pages available to a plurality of client receivers; and
an information processing unit configured to provide data to the carousel unit, the information processing unit including
    a content provider unit having a user interface configured to define a plurality of information templates may be defined, the information templates specifying content for a plurality of iTV pages;
    a composition provider unit having a user interface configured to define a plurality of presentation templates may be defined, the presentation templates specifying a presentational appearance for iTV pages,
    an editor having a user interface configured to receive a direct user association of a presentation template with an information template, and
    a processing unit configured to modify said information template by modifying the content of the information template in accordance with at least one requirement of the associated presentation template, the processing unit being configured to output, to the carousel unit, both the presentation template and a modified information template,
wherein both the presentation template and the modified information template are provided to the plurality of client receives by the carousel unit, an iTV page being obtained from the carousel unit by displaying the content specified by the modified information template with the presentation appearance specified by the presentation template.

19. A non-transitory computer-readable medium storing computer readable instructions thereon that when executed by a processor cause the processor to perform the method comprising:

making iTV pages available from a carousel to a plurality of client receivers;
    defining a plurality of information templates, each information template specifying a content for an iTV page;
    defining a plurality of presentation templates, each presentation template specifying a presentational appearance for the iTV page;
    receiving a direct user association of a presentation template with an information template;
    modifying the information template by modifying the content of the information template in accordance with at least one requirement of the presentation template; and
    outputting, to the carousel, both the presentation template and a modified information template,
    wherein both the presentation template and the modified information template are provided to the plurality of client receives by the carousel, an iTV page being obtained from the carousel by displaying the content specified by the modified information template with the presentational appearance specified by the presentation template.

\* \* \* \* \*